US009152585B2

(12) United States Patent
Ware (10) Patent No.: US 9,152,585 B2
(45) Date of Patent: Oct. 6, 2015

(54) MEMORY INTERFACE WITH REDUCED READ-WRITE TURNAROUND DELAY (75) Inventor: Frederick A. Ware, Los Altos Hills, CA (US)

(73) Assignee: Rambus Inc., Sunnyvale, CA (US)

(*) Notice: Subject to any disclaimer, the term of this patent is extended or adjusted under 35 U.S.C. 154(b) by 1041 days.

(21) Appl. No.: 13/128,853

(22) PCT Filed: Feb. 2, 2010

(86) PCT No.: PCT/US2010/022892
§ 371 (c)(1),
(2), (4) Date: May 11, 2011

(87) PCT Pub. No.: WO2010/093529
PCT Pub. Date: Aug. 19, 2010

(65) Prior Publication Data
US 2011/0289258 A1    Nov. 24, 2011

Related U.S. Application Data (60) Provisional application No. 61/152,177, filed on Feb. 12, 2009.

(51) Int. Cl.
*G06F 12/02* (2006.01)
*G06F 13/16* (2006.01)

(52) U.S. Cl.
CPC .......... *G06F 13/1689* (2013.01); *G06F 13/161* (2013.01)

(58) Field of Classification Search
CPC ................... G06F 13/4004–13/4077; G06F 13/4234–13/4243; G06F 13/00–13/4295
USPC .............. 710/31, 36, 38, 51, 107, 110; 711/5, 711/105, 154
See application file for complete search history.

(56) References Cited

U.S. PATENT DOCUMENTS

| 5,182,801 A * | 1/1993 | Asfour ........................... 709/214 |
| 5,627,968 A * | 5/1997 | Ozaki et al. .................... 709/212 |
| 5,717,874 A * | 2/1998 | Ishiwata ........................ 710/307 |
| 7,358,771 B1 | 4/2008 | Talbot |
| 2001/0000822 A1 * | 5/2001 | Dell et al. ...................... 711/170 |
| 2003/0217244 A1 | 11/2003 | Kelly |
| 2004/0001349 A1 * | 1/2004 | Perego et al. ................... 365/63 |
| 2005/0041683 A1 * | 2/2005 | Kizer ............................. 370/463 |
| 2005/0276261 A1 | 12/2005 | Kim |
| 2007/0011396 A1 * | 1/2007 | Singh et al. .................... 711/105 |
| 2007/0208819 A1 | 9/2007 | Talbot |

(Continued)

*Primary Examiner* — Aimee Li
*Assistant Examiner* — Nicholas Simonetti (57) ABSTRACT Embodiments of a memory system that communicates bidirectional data between a memory controller and a memory IC via bidirectional links using half-duplex communication are described. Each of the bidirectional links conveys write data or read data, but not both. States of routing circuits in the memory controller and the memory IC are selected for a current command being processed so that data can be selectively routed from a queue in the memory controller to a corresponding bank set in the memory IC via one of the bidirectional links, or to another queue in the memory controller from a corresponding bank set in the memory IC via another of the bidirectional links. This communication technique reduces or eliminates the turnaround delay that occurs when the memory controller transitions from receiving the read data to providing the write data, thereby eliminating gaps in the data streams on the bidirectional links.

22 Claims, 10 Drawing Sheets

(56) References Cited

U.S. PATENT DOCUMENTS

| | | | |
|---|---|---|---|
| 2008/0168304 A1* | 7/2008 | Flynn et al. | 714/7 |
| 2009/0031091 A1* | 1/2009 | Chang et al. | 711/154 |
| 2009/0240866 A1* | 9/2009 | Kajigaya | 710/317 |
| 2009/0276545 A1* | 11/2009 | Lee et al. | 710/8 |

* cited by examiner

MEMORY INTERFACE WITH REDUCED READ-WRITE TURNAROUND DELAY

TECHNICAL FIELD

The present embodiments relate to techniques for communicating information between integrated circuits. More specifically, the present embodiments relate to circuits and methods for communicating information between a memory controller and a memory integrated circuit with reduced turnaround delay.

BACKGROUND

Memory controllers communicate signals containing data, addresses or commands to one or more memory integrated circuits (ICs) through signal lines (which are also referred to as 'links'). In many memory systems, one or more links constitute a shared resource. For example, a memory IC (such as dynamic random-access memory or DRAM) may retrieve read data from an address in its memory core and may provide the read data to a memory controller via a bidirectional link between the memory controller and the memory IC. If the bidirectional link uses half-duplex communication, the memory controller may subsequently provide write data to the memory IC also via the bidirectional link.

However, a turnaround delay typically occurs when the memory controller transitions from receiving the read data to providing the write data via a link. This delay is associated with the round-trip time from the bidirectional link to the memory core and back again, as well as from delays through an interface in the memory IC. Hence, if alternating bursts of read and write data are communicated on the bidirectional link, gaps need to be included in the data stream to account for the turnaround delay, which reduces the effective data rate and the efficiency of communication between the memory controller and the memory IC.

BRIEF DESCRIPTION OF THE FIGURES

Table 1 provides communication directions on bidirectional links during four operating modes in the memory system of FIG. 1A.

DETAILED DESCRIPTION

Figure 1A:
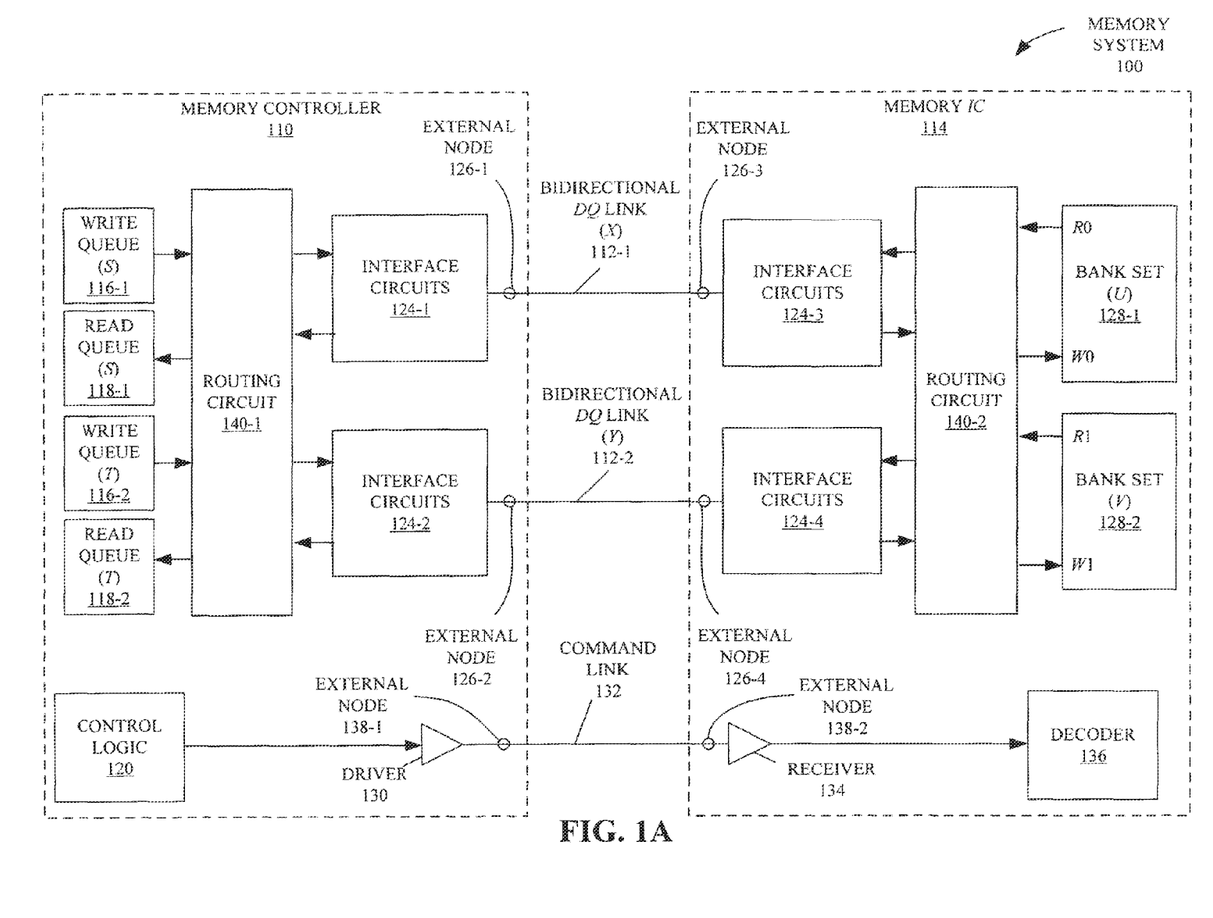
FIG. 1A depicts a memory system including a memory controller and a memory IC communicating with each other with reduced turnaround delay in accordance with an embodiment.

FIG. 1A presents a memory system 100 including a memory controller 110 and a memory IC 114 communicating with each other with reduced turnaround delay via bidirectional data (DQ) links 112. As shown in FIG. 1A, memory controller 110 includes a plurality of interface circuits 124 (such as interface circuits 124-1 and 124-2), a plurality of write queues 116 (such as write queue (S) 116-1 and write queue (T) 116-2), a plurality of read queues 118 (such as read queue (S) 118-1 and read queue (T) 118-2), and a routing circuit 140-1 between the interface circuits 124 and the read and write queues 116 and 118. Memory IC 114 includes a plurality of interface circuits 124 (such as interface circuits 124-3 and interface circuits 124-4), a plurality of banks or bank sets 128 (such as bank set (U) 128-1 and bank set (V) 128-2, which each may include DRAM), and a routing circuit 140-2 between the interface circuits 124 and the bank sets 128. Memory controller 110 and memory IC 114 each includes circuit or external nodes 126 that couple respective interface circuits 124 to respective bidirectional data (DQ) links 112.

Memory controller 110 also includes control logic 120 and one or more driver circuits 130 to convey command signals containing commands, addresses, and other control information to memory IC 114 using one or more command links 132, which is connect to memory controller 110 via respective circuit or external nodes, such as circuit node 138-1. Correspondingly, memory IC 114 includes one or more receiver circuits 134 coupled to command link 132 via respective circuit or external nodes (such as circuit node 138-2) to receive the command signals from memory controller 110. In addition, memory IC 114 includes one or more decoder circuits 136, coupled to the receiver circuits 134, to decode the received the command signals and to signal the bank sets 128 to either provide or store data onto or from bidirectional data (DQ) links 112 based at least in part on information contained in the command signal.

Memory system 100 may operate in different operating modes during different time intervals. A particular one of bidirectional data (DQ) links 112 is either conveying read data or write data based at least in part on the current operating mode of memory system 100. In one embodiment, control logic 120 determines the operating mode for a particular time interval. As an example, Table 1 lists whether bidirectional data (DQ) links 112-1 or 112-2 is used to convey read or write data in each of four different operating modes.

TABLE 1

|  | Bidirectional data (DQ) link (X) 112-1 | Bidirectional data (DQ) link (Y) 112-2 |
|---|---|---|
| Operating Mode A | Convey read data | Convey write data |
| Operating Mode B | Convey write data | Convey read data |
| Operating Mode C | Convey read data | Convey read data |
| Operating Mode D | Convey write data | Convey write data |

Each of bidirectional data (DQ) links 112 may be a serial link having a single wire or a pair of wires based at least in part on whether the data signals are common mode or differential signals. Moreover, each of bidirectional data (DQ) links 112 may also be a data bus having multiple or multiple pairs of wires to convey multiple bits of data in parallel. Furthermore, the signals representing read or write data may be amplitude-modulated electrical signals.

In one embodiment, bank sets 128 in memory IC 114 are micro-threaded so that each bank set is independently addressable and can concurrently perform operations associated with independent commands, including simultaneous column read/write. Examples of micro-threaded memory banks can be found in commonly assigned: U.S. Pat. No. 7,187,572, entitled "Early Read After Write Operation Memory Device, System and Method;" U.S. Pat. No. 7,380,092, entitled "Memory Device and System Having a Variable Depth Write Buffer and Preload Method;" U.S. patent application Ser. No. 11/853,708, entitled "Multi-Column Addressing Mode Memory System Including an Integrated Circuit Memory Device," filed on Sep. 30, 2004; and U.S. patent application Ser. No. 10/998,402, entitled "Multi-Mode Memory," filed on Nov. 29, 2004, each of which is incorporated herein by reference in its entirety.

Figure 1B:
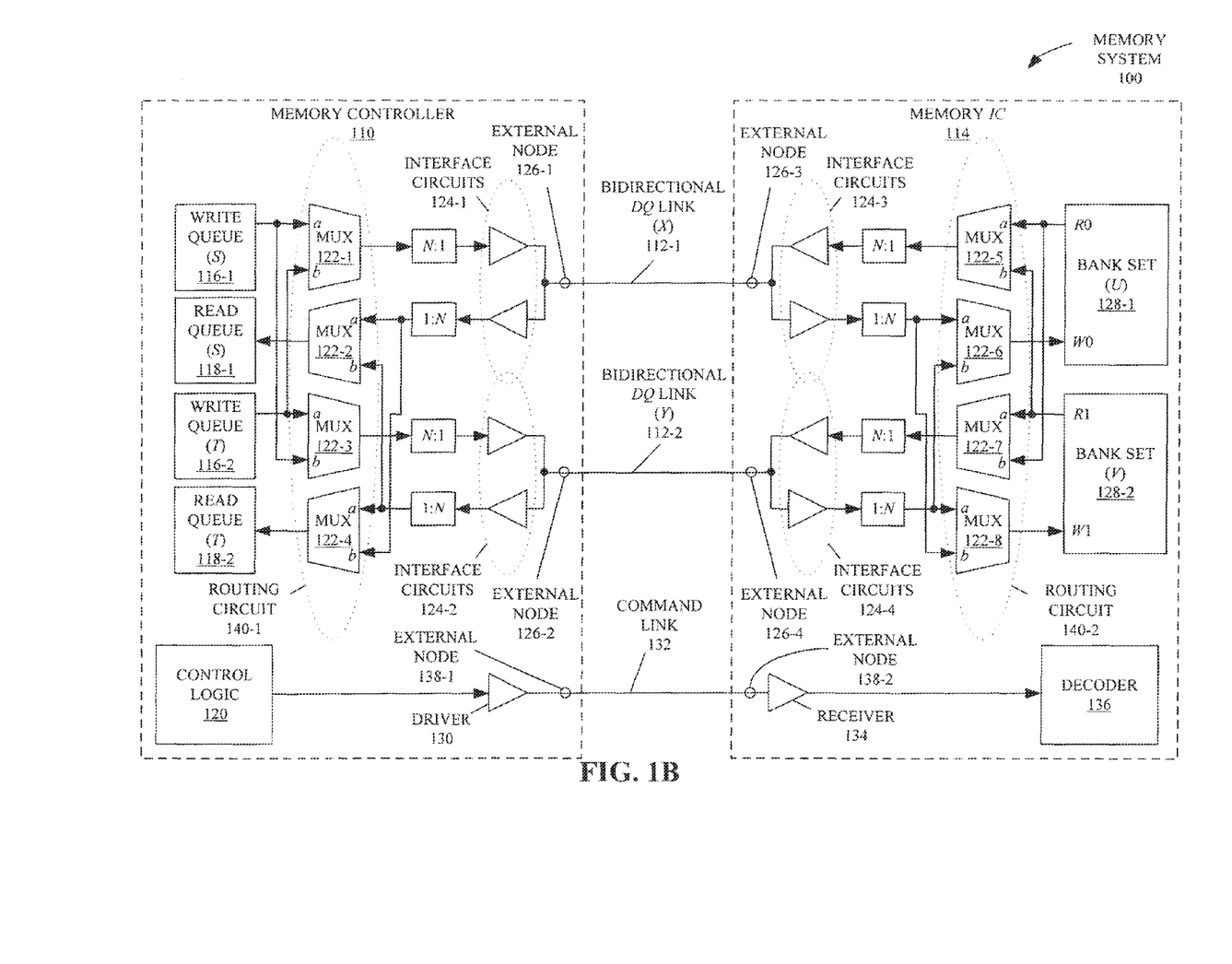
FIG. 1B depicts the memory system of FIG. 1A including the memory controller and the memory IC communicating with each other with reduced turnaround delay in accordance with an embodiment.

In one embodiment, by setting the routing circuits 140-1 and 140-2, data to be written to a particular bank set, such as bank set (U), can be stored in either one of write queues 116 in memory controller 110, and conveyed via either bidirectional data (DQ) links 112-1 or bidirectional data (DQ) links 112-2 (as defined by the current operating mode). Furthermore, by setting the routing circuits 140-1 and 140-2, data read from a particular bank set, such as bank set (V), can be conveyed via either bidirectional data (DQ) links 112-1 or bidirectional data (DQ) links 112-2 (as defined by the current operating mode), and stored in either one of read queues 118 in memory controller 110. As shown in FIG. 1B, in one embodiment, routing circuit 140-1 or 140-2 can be implemented using a set of multiplexers (MUX) 122, and each interface circuit 124 can be implemented using a pair of input/output drivers.

The aforementioned configurability of memory system 100 reduces or eliminates the delays between adjacent write and read operations associated with the round-trip time to bank sets 128. Consequently, the turnaround delay in memory system 100 is reduced or eliminated, which reduces or eliminates the corresponding gaps in the data streams on bidirectional DQ links 112, thereby increasing the effective data rate and the efficiency of communication between memory controller 110 and memory IC 114.

Figure 1C:
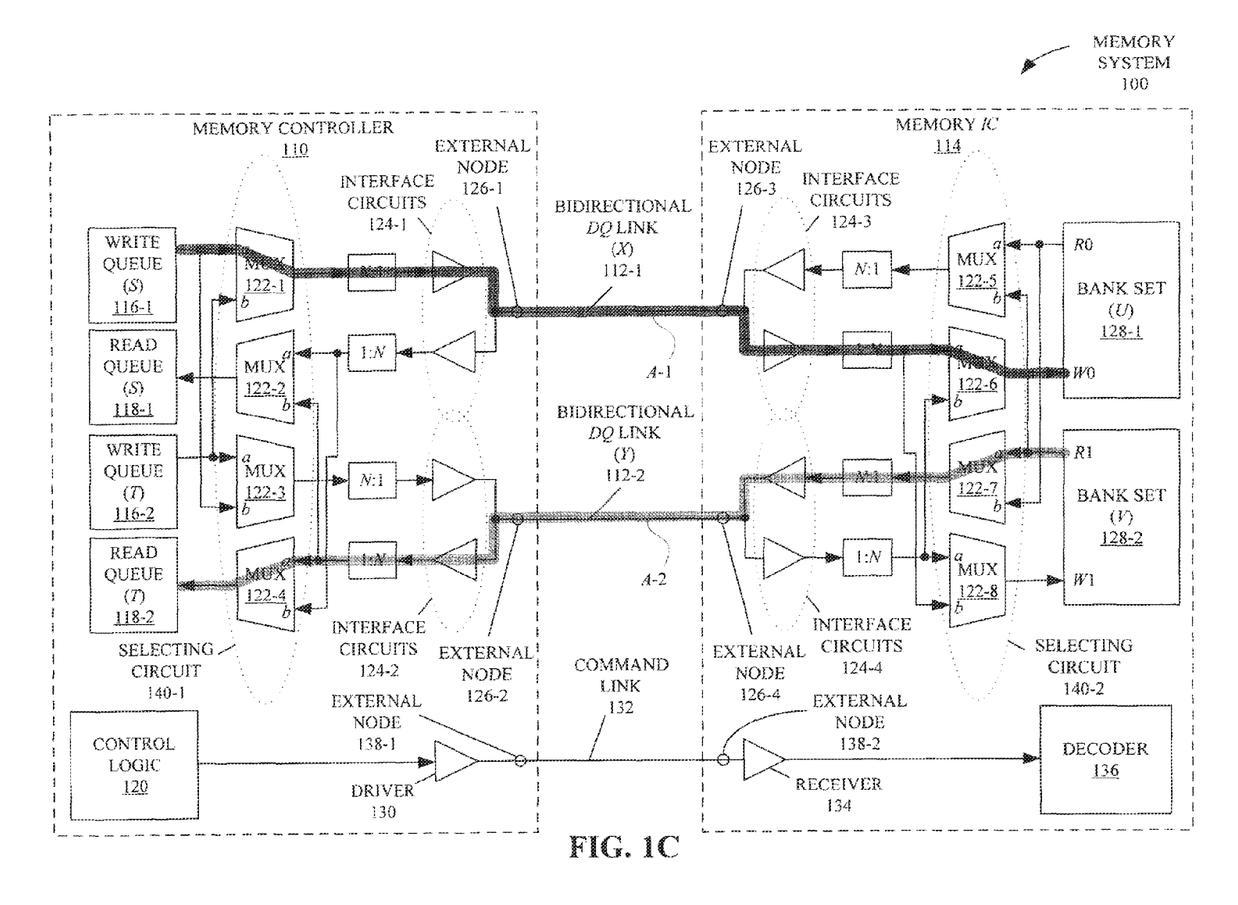
FIG. 1C depicts the memory system of FIG. 1A including the memory controller and the memory IC communicating with each other with reduced turnaround delay in accordance with an embodiment.
Figure 1D:
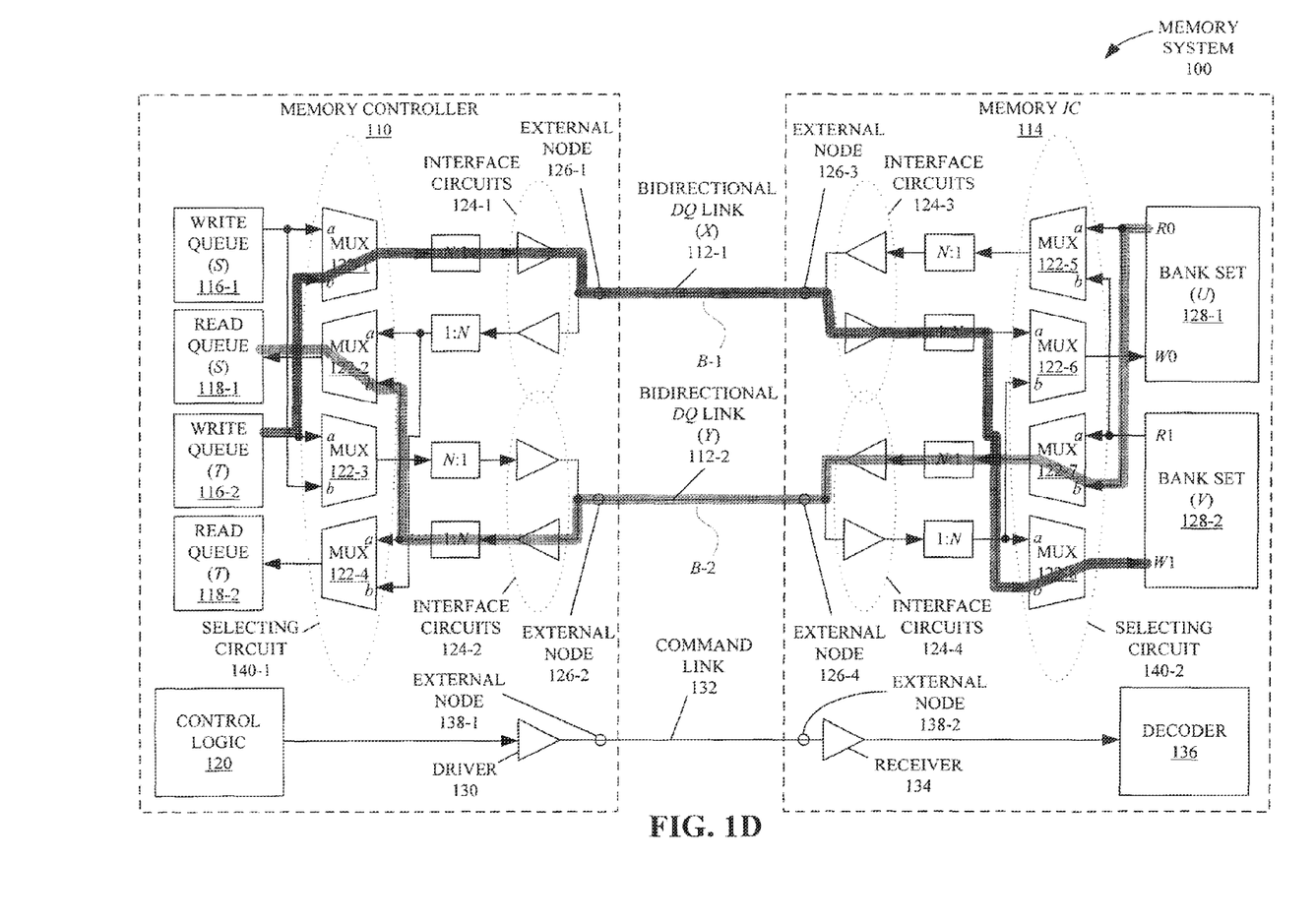
FIG. 1D depicts the memory system of FIG. 1A including the memory controller and the memory IC communicating with each other with reduced turnaround delay in accordance with an embodiment.
Figure 2A:
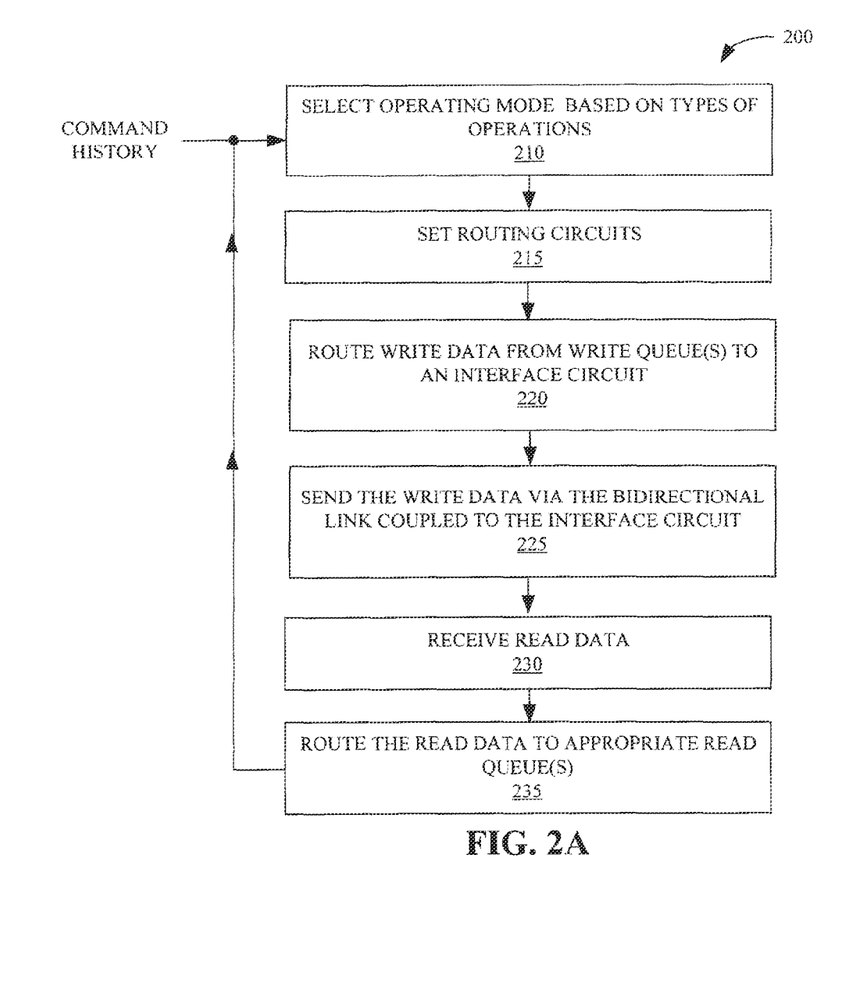
FIG. 2A depicts a method for communicating information between the memory controller and the memory IC in the memory system of FIG. 1A in accordance with an embodiment.

FIGS. 1C and 1D, and FIGS. 2A and 2B illustrate how memory system 100 can change from writing to (or reading from) a bank set to subsequently reading from (or writing to) the same bank set without causing turnaround delays. FIG. 2A illustrates a method 200 performed by memory controller 110 in accordance with an embodiment. In method 200, in response to commands, which may have been received from a processor (not shown) or another controller (not shown) and queued in memory controller 110 as a command history (such as a sequence of commands being processed that are stored in a RAM, ROM or using combinational logic), memory controller 110 selects a proper operation mode (operation 210). For example, if the commands are to write to bank set (U) 128-1 and read from bank set (V) 128-2, memory controller 110 may select operating mode B listed in Table 1.

Memory controller 110 may also set routing circuit 140-1 and send instructions via command link 132 to memory IC 114 to set routing circuit 140-2 based at least in part on the type of operations to be performed and the operating mode selected (operation 215). Memory controller 110 may queue the write data in, for example, write queue (S) 116-1. For example, the write data may be stored in write queues 116 based at least in part on the physical addresses associated with the write data. In particular, certain physical addresses may be associated with bank set (U) 128-1 and other physical addresses may be associated with bank set (V) 128-2. Then, memory controller 110 may subsequently route the write data using routing circuit 140-1 to the output driver in interface circuit 124-1 (operation 220) which sends the data to memory IC 114 via bidirectional data (DQ) links 112-1 (operation 225). This is illustrated in FIG. 1C. Using the input driver in interface circuit 124-2, memory controller 110 may receive read data from memory IC 114 via bidirectional data (DQ) links 112-2 (operation 230). This read data may be routed to read queue (T) 116-2 by routing circuit 140-1 (operation 235), as also shown in FIG. 1C.

Figure 2B:
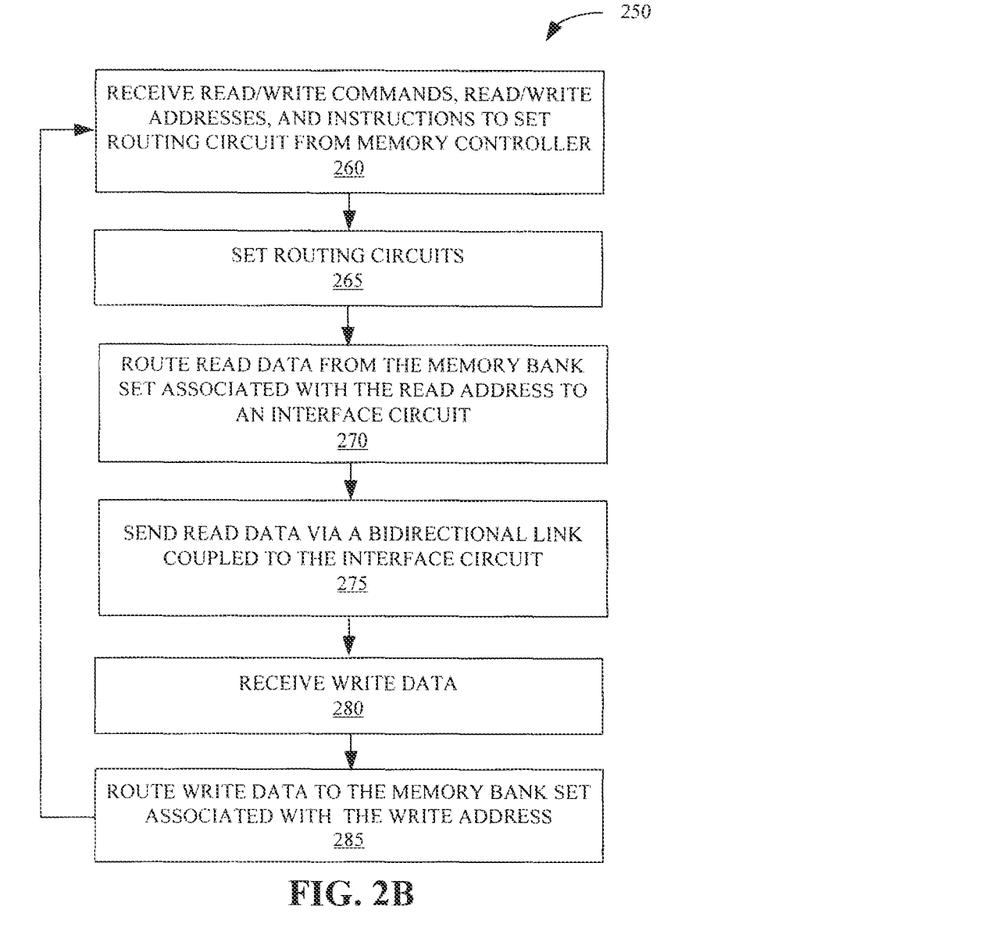
FIG. 2B depicts a method for communicating information between the memory controller and the memory IC in the memory system of FIG. 1A in accordance with an embodiment.

FIG. 2B illustrates a method 250 performed by memory IC 114 in accordance with an embodiment. In method 250, memory IC 114 may receive read and write commands, read and write addresses, and instructions to set routing circuit 140-2 from memory controller 110 via command link 132 from memory controller 110 (operation 260). Accordingly, memory IC 114 sets routing circuit 140-2 (operation 265), and routes read data from bank set (V) 128-2 to the output driver in interface circuit 124-4 (operation 270), which sends the read data to memory controller 110 via bidirectional data (DQ) links 112-2 (operation 275). Memory IC 114 may receive the write data using the input driver in interface circuit 124-3 from memory controller 110 via bidirectional data (DQ) links 112-1 (operation 280), and may subsequently route the write data to bank set (U) 128-1 (operation 285), as shown in FIG. 1C.

Referring back to FIG. 2A, after memory controller 110 completes operation 235, it may execute the next set of commands in the command history. If the next set of commands is to read from bank set (U) 128-1 and write to bank set (V) 128-2, memory controller may choose to select the same operation mode (operation 210), e.g., operation mode B listed in Table 1. Without changing the operation mode, bidirectional data (DQ) links 112-1 is used again to convey write data and bidirectional data (DQ) links 112-2 is used again to convey read data. Thus, no turn-around delay is incurred.

Again, based at least in part on the operating mode selected, memory controller 110 sets the routing circuit 140-1 and sends instructions via command link 132 to memory IC 114 to set the routing circuit 140-2 (operation 215). Memory controller 110 may queue the write data in, for example, write queue (T) 116-2, and may subsequently route the write data using routing circuit 140-1 to the output driver in interface circuit 124-1 (operation 220), which sends the write data to memory IC 114 via bidirectional data (DQ) links 112-1 (operation 225), as shown in FIG. 1D. Using the input driver in interface circuit 124-2, memory controller 110 may receive read data from memory IC 114 via bidirectional data (DQ) links 112-2 (operation 230). This read data may be routed to read queue (S) 116-1 by routing circuit 140-1 (operation 235), as also shown in FIG. 1D.

Furthermore, as shown in FIG. 2B, memory IC 114 may receive read and write commands, read and write addresses, and instructions to set routing circuit 140-2 from memory controller 110 via command link 132 from memory controller 110 (operation 260). Accordingly, memory IC 114 sets routing circuit 140-2 (operation 265), and routes read data from bank set (U) 128-1 to the output driver in interface circuit 124-4 (operation 270), which sends the read data to memory controller 110 via bidirectional data (DQ) links 112-2 (operation 275), as shown in FIG. 1D. Memory IC 114 receives the write data using the input driver in interface circuit 124-3 from memory controller 110 via bidirectional data (DQ) links 112-1 (operation 280), and subsequently routes the write data to bank set (V) 128-2 (operation 285), as also shown in FIG. 1D.

Thus, each of bidirectional DQ links 112 may use half-duplex communication (i.e., for a particular operating mode, communication on a given bidirectional DQ link is in one direction, either from memory controller 110 to memory IC 114, or from memory IC 114 to memory controller 110), which reduces or eliminates the delays between adjacent write and read operations that are associated with the round-trip time from bidirectional DQ links 112 to bank sets 128 in memory IC 114. Furthermore, data is communicated on the bidirectional DQ links 112 through unidirectional interface circuits 124 in memory controller 110 and memory IC 114, which eliminate collisions between write and read data. For example, when the operating mode specifies that write data are to be conveyed via bidirectional DQ link (Y) 112-2, a driver in interface circuits 124-2 in memory controller 110 transmits the corresponding electrical signals, and a receiver in interface circuits 124-4 in memory IC samples and quantizes these electrical signals to recover the write data, which is then conveyed to the appropriate bank set.

Methods 200 and 250 may include fewer or additional operations. Moreover, two or more operations may be combined into a single operation and/or a position of one or more operations may be changed.

In one embodiment, control logic 120 in memory controller 110 may provide information related to a current operating mode for system 100 and/or settings for routing circuit 140-2 to driver circuit(s) 130, which transmits this information as, for example, amplitude-modulated electrical signals, on command link 132 to memory IC 114. Receiver circuit(s) 134 in memory IC 114 samples and quantizes these electrical signals to recover the information, which is then decoded by decoder 136 and conveyed as state-setting signals to routing circuit 140-2 prior to communication of the write data or the read data. For example, referring to FIG. 1B, because there are two possible data-routing arrangements for multiplexers 122-5 through 122-8 (at a given time, two of these multiplexers selectively route data to or from bank sets 128), the state information for these multiplexers may be specified using one or two bits in a field. Instead of using command link 132, in some embodiments the state information for multiplexers 122-5 through 122-8 is conveyed on bidirectional DQ links 112 using in-band or side-band communication.

In some embodiments, data to be communicated on bidirectional DQ links 112 is converted from parallel to serial using parallel to serial converter N:1 prior to transmission and from serial to parallel using serial to parallel converter 1:N after being received. For example, bidirectional DQ links 112 may each operate at 3200 MHz. Data on N parallel signal lines (such as 8 or 32 signal lines) in memory controller 110 and memory IC 114 may be communicated at 1/Nth of 3200 MHz.

While the preceding embodiments illustrate the communication of write data on one of the bidirectional DQ links 112 and read data on the other of the bidirectional DQ links 112 during a current operating mode, in other embodiments the bidirectional DQ links 112 may both communicate write data or may both communicate read data during the current operating mode. Furthermore, in some embodiments, the direction of communication on either or both of the bidirectional DQ links 112 alternates during time intervals in adjacent operating modes. For example, during a first operating mode, bidirectional DQ link (X) 112-1 may convey read data and bidirectional DQ link (Y) 112-2 may convey read data. Then, in a subsequent, second operating mode, bidirectional DQ link (X) 112-1 may convey read data and bidirectional DQ link (Y) 112-2 may convey write data. This alternating pattern may be repeated during subsequent operating-mode cycles. Alternatively, during a third operating mode, bidirectional DQ link (X) 112-1 may convey write data and bidirectional DQ link (Y) 112-2 may convey write data. Then, in a subsequent, fourth operating mode, bidirectional DQ link (X) 112-1 may convey write data and bidirectional DQ link (Y) 112-2 may convey read data. Once again, this alternating pattern may be repeated during subsequent operating-mode cycles.

Furthermore, while FIG. 1A illustrates the application of this communication technique to bidirectional DQ links, in other embodiments the communication technique can be applied to bidirectional command links, or to links that can be configured as command links or DQ links.

In some embodiments, the order in which commands are processed, the states of routing circuits 140, or both, are determined based in part on additional factors. For example, in some embodiments, commands in a stack are processed based at least in part on associated priorities. As described further below with reference to FIG. 4A, this approach may allow the write queues 116 to be serviced without interrupting so-called high-priority read operations or transactions (which may be defined by a processor or another controller that provides the commands). Furthermore, in some embodiments, control logic 120 processes commands in order to avoid a full write queue or a full read queue. In addition, control logic 120 may perform alternating bursts of one or more write operations or one or more read operations, or may perform transactions that are associated with a fixed data size or a fixed amount of data.

Figure 3A:
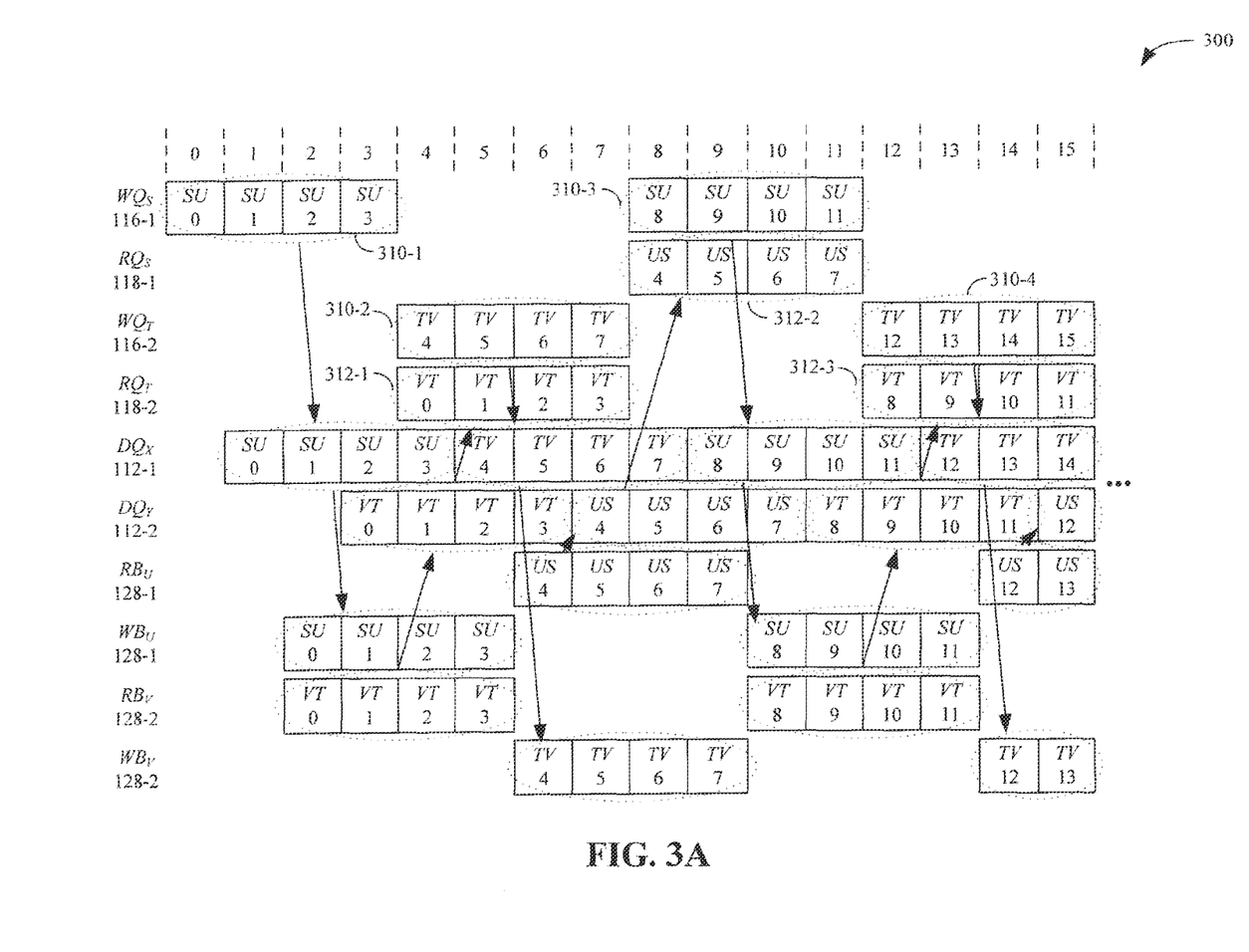
FIG. 3A depicts a timing diagram for communication between the memory controller and the memory IC in the memory system of FIG. 1A in accordance with an embodiment.
Figure 3B:
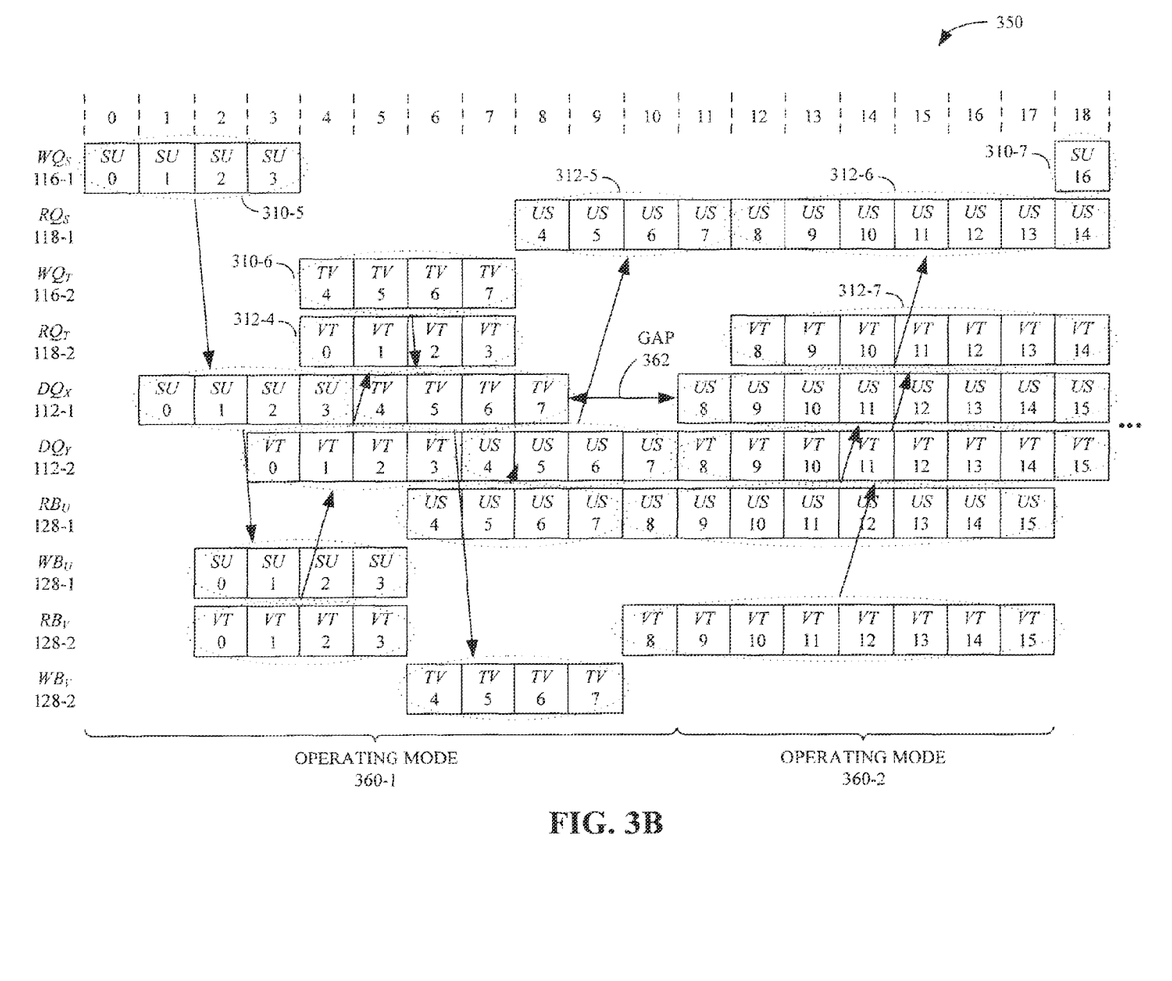
FIG. 3B depicts a timing diagram for communication between the memory controller and the memory IC in the memory system of FIG. 1A in accordance with an embodiment.

As an example, FIG. 3A presents a timing diagram 300 for the operations of memory system 100 described above with reference to FIGS. 1C and 1D. During time intervals 0-15 in this example, bidirectional DQ link (X) 112-1 conveys write data and bidirectional DQ link (Y) 112-2 conveys read data. In FIG. 3A (and FIG. 3B below), each block of data in each time interval in the queues or banks represents N bits communicated on N parallel signal lines. The exception in FIGS. 3A and 3B are the blocks of data on bidirectional DQ links 112. These data blocks each represent N bits communicated in series on a high-speed bidirectional DQ link.

In FIG. 3A, blocks of data 310 are communicated from write queues 116 to bidirectional DQ link (X) 112-1, and then to corresponding bank sets 128. Similarly, blocks of data 312 are communicated from bank sets 128 to bidirectional DQ link (Y) 112-2, and then to corresponding read queues 118. In particular, FIG. 3A illustrates operating mode B listed in Table 1. Write data (SU) 310-1 from write queue ($WQ_S$) 116-1 is conveyed on bidirectional DQ link (X) 112-1 during time intervals 1-4 and stored in (WB$_U$) associated with bank set (U) 128-1 during time intervals 2-5, while read data (VT) 312-1 from read buffer (RB$_V$) associated with bank set (V) 128-2 is conveyed on bidirectional DQ link (Y) 112-2 during time intervals 3-6 and queued at read queue (RQ$_T$) 118-2 during time intervals 4-7. While still in operating mode B, write data (TV) 310-2 from write queue (WQ$_T$) 116-2 is conveyed on bidirectional DQ link (X) 112-1 during time intervals 5-8 and buffered at a write buffer (WB$_V$) associated with bank set (U) 128-2 during time intervals 6-9, while read data (US) 312-2 from read buffer (RB$_U$) associated with bank set (U) 128-1 is conveyed on bidirectional DQ link (Y) 112-2 during time intervals 7-10 and queued at read queue (RQ$_S$) 118-1 during time intervals 8-11. This alternating use of bank sets 128 continues in the remaining time intervals. In this example, all of the data slots on bidirectional DQ links 112 are used. The communication technique thus increases the effective data rate and the efficiency of communication between the memory controller 110 and the memory IC 114.

FIG. 3B presents a timing diagram 350 for communication between memory controller 110 and memory IC 114 of FIG. 1A during time intervals 0-18, in which change of operating mode from operating mode B listed in Table 1 to operating mode C listed in Table 1 is required to execute two different sets of commands in sequence. During operating mode 360-1 (or operating mode B), with which memory system 100 executes the commands to write to bank set (U) 128-1 and read from bank set (V) 128-2, bidirectional DQ link (X) 112-1 conveys write data and bidirectional DQ link (Y) 112-2 conveys read data. Then, during operating mode 360-2 (or operating mode C), with which memory system 100 executes the commands to read from bank set (U) 128-1 and to read from bank set (V) 128-2, bidirectional DQ link (X) 112-1 conveys read data and bidirectional DQ link (Y) 112-2 also conveys read data. In subsequent time intervals, these alternating operating modes 360 may be repeated. Operating mode 360-1 allows write queues 116 in memory controller 110 to be emptied, while the write queues 116 are filled during operating mode 360-2.

In this example, two-thirds of the time slots on bidirectional DQ links 112 are used for read operations and one-third are used for write operations. During a respective operating mode, the worst-case delay for a high-priority read is one time interval (such as a clock cycle or a half clock cycle). When the operating mode 360 changes, there is a delay associated with the round-trip time to bank set (U) 128-1. This turnaround delay necessitates gap 362 in the data streams.

Note that FIG. 3A illustrates the optimal case of 50% read and 50% write to each bank set 128, while FIG. 3B provides an illustration of 25% write and 75% read to each bank set 128. There is a turnaround gap 362 that results from switching interface circuits 124-1 and 124-3 between write and read operation. But the overall turnaround delay is reduced relative to systems without routing circuits 140 because of the other bidirectional link. Moreover, as described below, interface circuits 124-2 and 124-4 are continuously available to perform high-priority reads for bank sets 128-1 and 128-2 during the times that interface circuits 124-1 and 124-3 are performing writes, are turning around (when the operating mode changes), or are performing calibration.

In some embodiments, during periodic calibration operations, a bidirection link may be temporarily removed from service. These calibration operations may include one or more of: transmitting/receiving a phase calibration for timing; calibrating signal voltage swing or common mode voltage; calibrating termination, or calibrating equalization. As one skilled in the art can readily appreciate, there are myriad system parameters that can be optimized in accordance with an embodiment. Some examples of parameters that can be adjusted in this manner include: equalization coefficients, crosstalk cancellation coefficients, output drive levels, termination settings, transmit and receive clock offsets, input receiver windows, as well as many others. In these examples, the following definitions are used: a termination setting is a parameter that affects a termination impedance of a transmission line; a transmit clock offset is a parameter that affects the temporal position of a clock signal in a transmit circuit, or the temporal position of a signal transmitted by a transmit circuit; a receive clock offset is a parameter that affects the temporal position of a clock signal in a receive circuit, the temporal position of a signal used by the receive circuit for receiving a transmitted signal, or the temporal position of a sampling time during which a transmitted signal is sampled by the receive circuit; an input receiver window is a parameter affecting the differentiation of different logic levels in the receive circuit; an output drive level is a parameter affecting the representation of different logic levels at the transmit circuit; a crosstalk cancellation coefficient is a parameter affecting immunity to crosstalk caused by signals on other conductors; and an equalization coefficient is a parameter that may be adjusted to effect equalization adjustment.

Figure 4A:
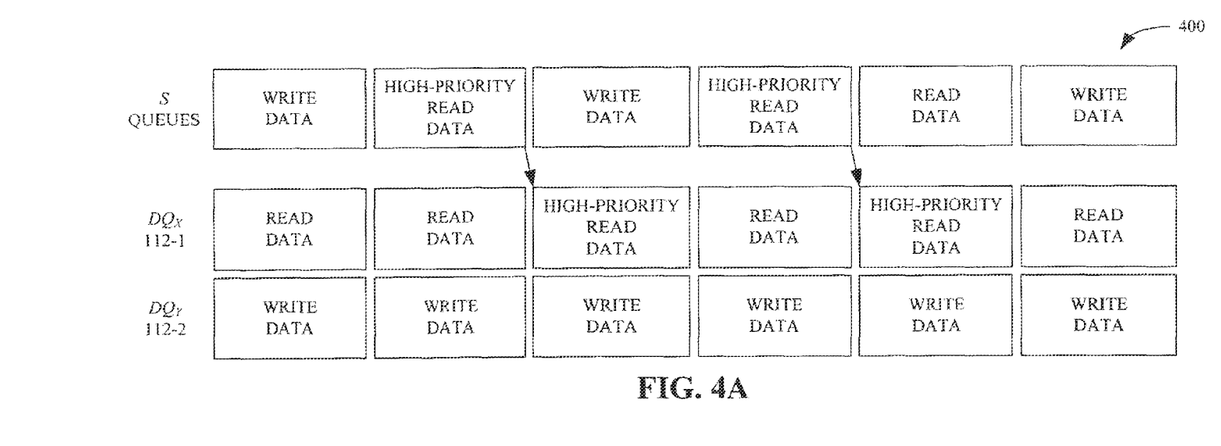
FIG. 4A depicts a timing diagram illustrating the processing of high-priority read commands during communication between the memory controller and the memory IC in the memory system of FIG. 1A in accordance with an embodiment.

If one of the bidirectional DQ links 112 in FIG. 1A is always configured to convey read data, memory system 100 can always perform high-priority read operations. For example, high-priority read data can be communicated on one of the bidirectional DQ links 112 and lower-priority read data can be communicated on this bidirectional DQ link or the other bidirectional DQ link (if the operating mode is alternated from write/read on the bidirectional DQ links 112 to read/read on the bidirectional DQ links 112). This is shown in FIG. 4A, which presents a timing diagram 400 illustrating the processing of high-priority read commands during communication between memory controller 110 and memory IC 114 of FIG. 1A.

Figure 4B:
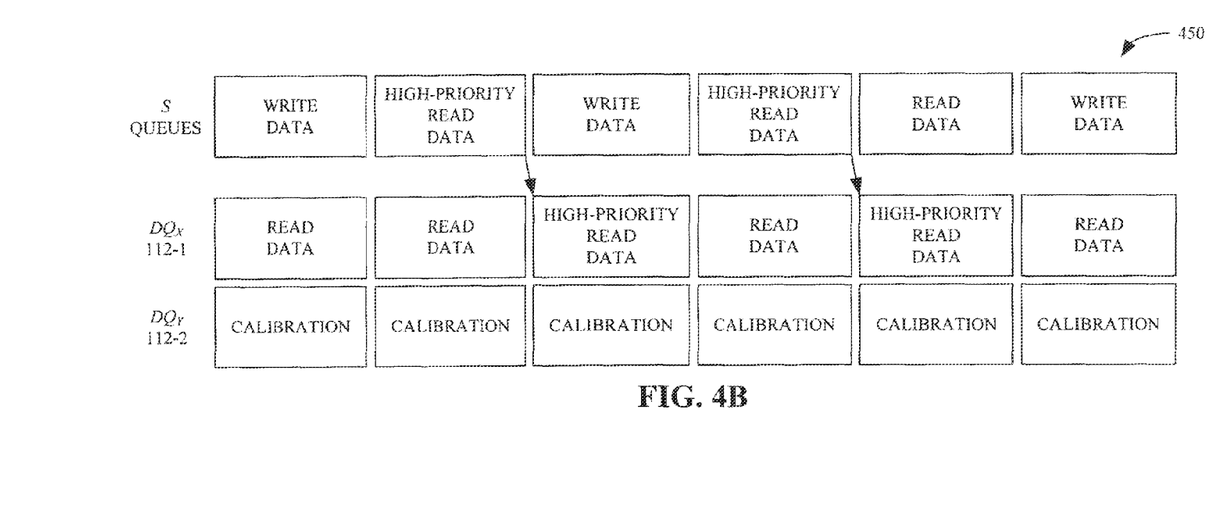
FIG. 4B depicts a timing diagram illustrating the processing of high-priority read commands while a bidirectional link between the memory controller and the memory IC in the memory system of FIG. 1A is being calibrated in accordance with an embodiment.

Similarly, while one of the bidirectional DQ links 112 in FIG. 1A is being calibrated, the other bidirectional DQ link may convey read data. This allows high-priority read data to be communicated with a limited worst-case read latency (in the worst-case, read operations can be performed at one-half of the peak rate). FIG. 4B presents a timing diagram 450 illustrating the processing of high-priority read commands while a bidirectional link (such as bidirectional link 112-1) between memory controller 110 and memory IC 114 of FIG. 1A is being calibrated. During the calibration, write queues 116 can temporarily store write data for write operations to memory IC 114.

Figure 5:
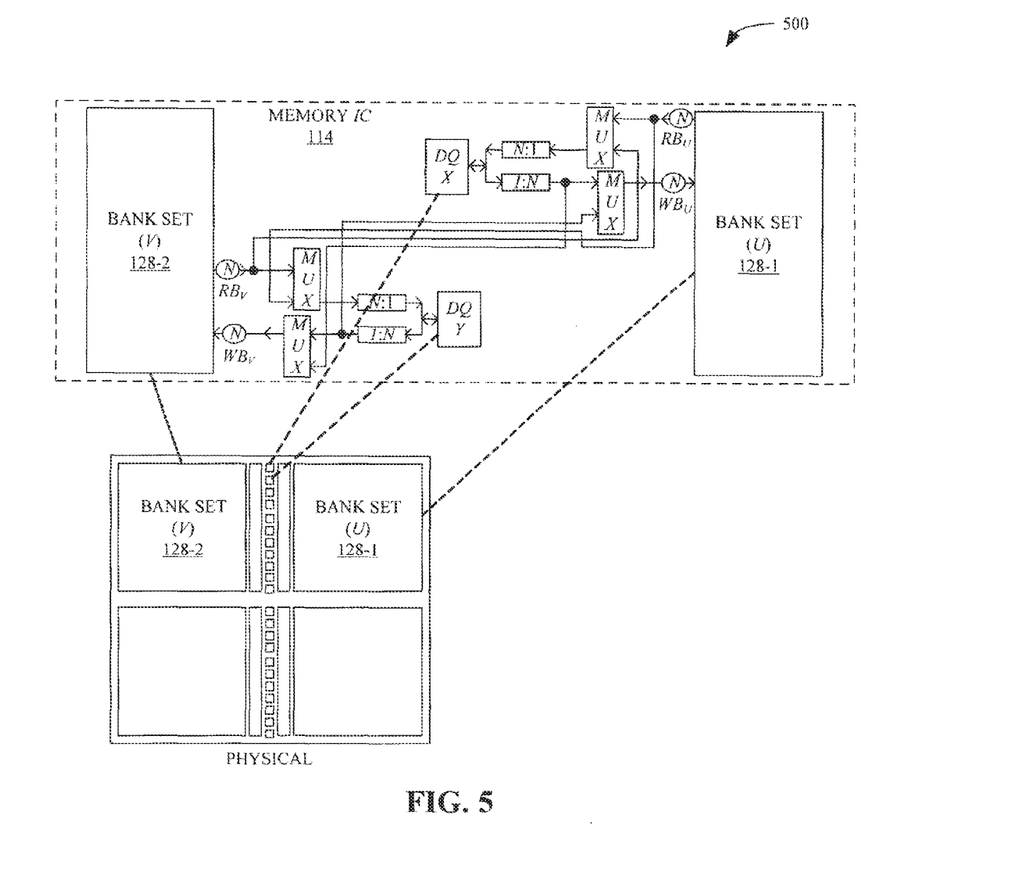
FIG. 5 depicts the memory system of FIG. 1A including the memory controller and the memory IC communicating with each other with reduced turnaround delay in accordance with an embodiment.

A variety of physical layouts may be used to implement memory system 100 in FIG. 1A. As an illustration, FIG. 5 presents an embodiment 500 of a physical implementation of memory system 100 in FIG. 1A. Moreover, FIG. 5 illustrates that memory system 100 in FIG. 1A may include more than two bidirectional links, more than two interface circuits and more than two bank sets.

In the foregoing description and in the accompanying drawings, specific terminology and drawing symbols are set forth to provide a thorough understanding of the present invention. In some instances, the terminology and symbols may imply specific details that are not required to practice the invention. Consequently, these embodiments may include fewer components or additional components. Moreover, components may be combined into a single component and/or the position of one or more components may be changed.

While the preceding embodiments used a memory system implemented on separate integrated circuits as an illustration, memory controller 110 and memory IC 114 in FIG. 1A may be implemented on a single integrated circuit or different integrated circuits. For example, memory controller 110 may be included on a processor in a computer system. Furthermore, in some embodiments, an equivalent means for selecting the operating mode and states of multiplexers 122 is used instead of control logic 120.

An output of a process for designing an integrated circuit, or a portion of an integrated circuit, comprising one or more of the circuits described herein may be a computer-readable medium such as, for example, a magnetic tape or an optical or magnetic disk. The computer-readable medium may be encoded with data structures or other information describing circuitry that may be physically instantiated as an integrated circuit or portion of an integrated circuit. Although various formats may be used for such encoding, these data structures are commonly written in Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on a computer-readable medium. Those of skill in the art of integrated circuit fabrication can use such encoded data to fabricate integrated circuits comprising one or more of the circuits described herein.

While the present invention has been described in connection with specific embodiments, the claims are not limited to what is shown. For example, in some embodiments the links between memory controller 110 and memory IC 114 in FIG. 1A may utilize full-duplex communication (i.e., for a particular operating mode, communication on a given bidirectional DQ link is in both directions, from memory controller 110 to memory IC 114, and from memory IC 114 to memory controller 110). Similarly, data or commands may be communicated using other encoding or modulation techniques. For example, embodiments of the invention may be adapted for use with multi-pulse-amplitude-encoded (multi-PAM) signals.

Moreover, some components are shown directly connected to one another, while others are shown connected via intermediate components. In each instance the method of interconnection, or 'coupling,' establishes some desired electrical communication between two or more circuit nodes, or terminals. Such coupling may often be accomplished using a number of circuit configurations, as will be understood by those of skill in the art. For example, the foregoing embodiments support AC-coupled links, DC-coupled links, or both. Therefore, the spirit and scope of the appended claims should not be limited to the foregoing description. Only those claims specifically reciting "means for" or "step for" should be construed in the manner required under the sixth paragraph of 35 U.S.C. §112.

What is claimed is:

1. A memory controller for use with a memory integrated circuit (IC) having a plurality of bidirectional signal interfaces and a plurality of memory banks, the memory controller comprising:
    a plurality of signal interfaces to communicate signals via a plurality of communication links with respective ones of the bidirectional signal interfaces of the memory IC;
    a command interface to convey settings of a routing circuit in the memory IC such that the memory IC may properly route the signals between the plurality of communication links and the plurality of memory banks;
    queues to store a set of commands for transmission to the memory IC;
    control logic to determine the settings of a routing circuit in the memory controller configured to route read data and write data, corresponding to the set of commands, between the queues and the plurality of signal interfaces, and to determine the settings of the routing circuit in the memory IC, each of the memory controller routing circuit settings and memory IC routing circuit settings based at least in part on the set of commands in the queues; and
    wherein the memory IC routing circuit settings are to cause the routing circuit in the memory IC to use a first link of the plurality of communications links in a unidirectional manner, to receive write data irrespective of which of the plurality of banks is the subject of a write command, and to use a second link of the plurality of communication links in a unidirectional manner, to transmit read data irrespective of which of the plurality of banks is the subject of a read command, so as to avoid a driver turn-around time associated with the bidirectional signal interfaces.

2. The memory controller of claim 1, wherein the control logic selects an operating mode, and determines the settings of the routing circuit in the memory IC, based at least in part on the a set of commands being processed, the operating mode specifying whether a particular one of the plurality of communication links is used to convey read or write data.

3. The memory controller of claim 2, wherein the queues comprise a plurality of read/write queues and wherein the control logic is further to determine settings of the routing circuit in the memory controller such that read/write data are properly routed between the plurality of read/write queues and the plurality of signal interfaces based at least in part on the set of commands being processed.

4. The memory controller of claim 2, wherein the control logic is to select the operating mode based at least in part on a sequence of commands.

5. The memory controller of claim 1, wherein the memory controller is to calibrate one of the plurality of communication links while the other communication links in the plurality of communication links are being used to communicate signals associated with read or write data.

6. A method, performed by a memory controller, for communicating with a memory integrated circuit (IC) via first and second data communication links, the memory IC including first and second bank sets, each bank set having at least one bank, the method comprising:
    in response to first commands to write to a first address in the first bank set in the memory IC and to read from a second address in the second bank set in the memory IC, sending first write data to the memory IC via the first data communication link and receiving first read data from the memory IC via the second data communication link;
    in response to second commands to write to a third address in the second bank set in the memory IC and to read from a fourth address in the first bank set in the memory IC, sending second write data to the memory IC via the first data communication link and receiving second read data from the memory IC via the second data communication link;
    utilizing queues within the memory controller to store a set of commands for transmission to the memory IC;
    utilizing control logic within the memory controller to determine the settings of a routing circuit in the memory controller configured to route read data and write data, corresponding to the set of commands, between the queues and the data communication links, and to determine the settings of a routing circuit in the memory IC, each of the memory controller routing circuit settings and memory IC routing circuit settings based at least in part on the set of commands in the queues; and configuring the memory IC to utilize bidirectional signal interfaces respectively associated with the first communication link and the second communication link each for unidirectional data transfer only, to respectively exchange the first and second read data and the first and second write data, so as to avoid a driver turnaround time associated with said bidirectional signal interfaces.

7. The method of claim 6, wherein the second write data immediately follows the first write data on the first data communication link while the second read data immediately follows the first read data on the second data communication link.

8. The method of claim 6, further comprising:
transmitting first settings of the routing circuit in the memory IC in response to first commands;
and transmitting second settings of the routing circuit in the memory IC in response to second commands, such that the memory IC properly routes the read and write data between the first and second data communication links and the first and second memory bank sets.

9. The method of claim 6, further comprising in response to third commands to read from a fifth address in the first bank set and to read from a sixth address in the second bank set, receiving third read data from the memory IC via the first data communication link and receiving fourth read data from the memory IC via the second communication link, the third read data following the first write data on the first data communication link after a time interval equal to or larger than a turnaround time associated with said bidirectional signal interfaces.

10. A memory controller for use with a memory integrated circuit (IC) having a plurality of bidirectional signal interfaces and a plurality of memory banks, comprising:
means for communicating signals via a plurality of communication links with respective ones of the bidirectional signal interfaces of the memory IC;
means for conveying settings of a routing circuit in the memory IC such that the memory IC properly routes the signals between the plurality of communication links and the plurality of memory banks;
queues to store a set of commands for transmission to the memory IC;
control logic to determine the settings of a routing circuit in the memory controller configured to route read data and write data, corresponding to the set of commands, between the queues and the means for communicating signals, and to determine the settings of the routing circuit in the memory IC, each of the memory controller routing circuit settings and memory IC routing circuit settings based at least in part on the set of commands in the queues; and
wherein the memory IC routing circuit settings are to cause the routing circuit in the memory IC to use a first link of the plurality of communications links in a unidirectional manner, to receive write data irrespective of which of the plurality of banks is the subject of a write command, and to use a second link of the plurality of communication links in a unidirectional manner, to transmit read data irrespective of which of the plurality of banks is the subject of a read command, so as to avoid a driver turnaround time associated with the bidirectional signal interfaces.

11. A system comprising:
a memory integrated circuit (IC) having first and second memory bank sets, each bank set having at least one bank, first and second bidirectional signal interfaces and a routing circuit;
a first link electrically coupled to the first bidirectional signal interface of the memory IC;
a second link electrically coupled to the second bidirectional signal interface of the memory IC;
a command/address link electrically coupled to the memory IC; and
a memory controller, electrically coupled to the first link, the second link, and the command link, wherein the memory controller comprises:
a command interface to convey settings of the routing circuit in the memory IC via the command link such that the memory IC properly routes the signals between the first and second links and the first and second memory bank sets;
queues to store a set of commands for transmission to the memory IC;
control logic to determine the settings of a routing circuit in the memory controller configured to route read data and write data, corresponding to the set of commands, between the queues and the bidirectional signal interfaces, and to determine the settings of the routing circuit in the memory IC, each of the memory controller routing circuit settings and memory IC routing circuit settings based at least in part on the set of commands in the queues; and
wherein the memory IC routing circuit settings are to cause the routing circuit in the memory IC to utilize bidirectional signal interfaces respectively associated with the first communication link and the second communication link each for unidirectional data transfer only, to respectively exchange read data and write data irrespective of bank set, so as to avoid a driver turnaround time associated with said bidirectional signal interfaces.

12. The system of claim 11, wherein the first bank set and the second bank set are independently addressable and can concurrently perform operations associated with independent commands.

13. A memory integrated circuit (IC), comprising:
a plurality of memory banks;
a plurality of bidirectional signal interfaces to communicate signals with a memory controller via a corresponding plurality of communication links;
a routing circuit coupled between the plurality of memory banks and the plurality of signal interfaces; and
a command interface to receive settings of the routing circuit such that the routing circuit properly routes the signals between the plurality of communication links and the plurality of memory banks;
wherein the memory controller comprises:
queues to store a set of commands for transmission to the memory IC; and
control logic to determine the settings of a routing circuit in the memory controller configured to route read data and write data, corresponding to the set of commands, between the queues and the plurality of signal interfaces, and to determine the settings of the routing circuit in the memory IC, each of the memory controller routing circuit settings and memory IC routing circuit settings based at least in part on the set of commands in the queues; and
wherein the memory IC routing circuit settings are to cause the routing circuit in the memory IC to use a first link of the plurality of communications links in a unidirectional manner, to receive write data irrespective of which of the plurality of banks is the subject of a write command, and to use a second link of the plurality of communication links in a unidirectional manner, to transmit read data irrespective of which of the plurality of banks is the subject of a read command, so as to avoid a driver turnaround time associated with the bidirectional signal interfaces.

14. The memory IC of claim 13, wherein the plurality of banks include a first bank set and a second bank set, and the plurality of signal interfaces include a first signal interface and a second signal interface, wherein the routing circuit can be set to route signals between the first bank set and the first signal interface and to route signals between the second bank set and the second signal interface, and wherein the routing circuit can also be set to route signals between the first bank set and the second signal interface and to route signals between the second bank set and the first signal interface.

15. The memory IC of claim 13, wherein the memory IC is to receive a command from the memory controller that specifies the settings according to a code, and wherein the memory IC further comprises a decoder to decode the settings from the code and to set the routing circuit based on the settings.

16. The memory IC of claim 13, wherein the memory IC is to receive a command from the memory controller that specifies the settings, and wherein the routing circuit includes multiplexer circuits, the routing circuit to configure the multiplexer circuits according to the settings.

17. A method for a memory integrated circuit (IC) to communicate information to and from a memory controller, comprising:
in response to first commands to write to a first address in a first bank set in the memory IC and to read from a second address in a second bank set in the memory IC, receiving first write data from a first data communication link and sending first read data via a second data communication link;
in response to second commands to write to a third address in the second bank set in the memory IC and to read from a fourth address in the first bank set in the memory IC, receiving second write data from the first data communication link and sending second read data via the second data communication link;
wherein each bank set includes at least one memory bank;
utilizing queues within the memory controller to store a set of commands for transmission to the memory IC;
utilizing control logic within the memory controller to determine the settings of a routing circuit in the memory controller configured to route read data and write data, corresponding to the set of commands, between the queues and the data communication links, and to determine the settings of a routing circuit in the memory IC, each of the memory controller routing circuit settings and memory IC routing circuit settings based at least in part on the set of commands in the queues; and
wherein the memory IC is to utilize bidirectional signal interfaces respectively associated with the first data communication link and the second data communication link each for unidirectional data transfer only, to respectively exchange the first and second read data and the first and second write data, so as to avoid a driver turnaround time associated with said bidirectional signal interfaces.

18. The method of claim 17, further comprising:
receiving first instructions from the memory controller to set the routing circuit in the memory IC such that the first write data is routed between the first communication link and the first bank set and the first read data is routed between the second communication link and the second bank set; and
receiving second instructions from the memory controller to set the routing circuit in the memory IC such that the second write data is routed between the first communication link and the second bank set and the second read data is routed between the second communication link and the first bank set.

19. The method of claim 17, wherein a state of the routing circuit is based at least in part on a current command being processed.

20. A memory controller for use with a memory integrated circuit (IC) having a plurality of bidirectional signal interfaces and a plurality of memory banks, the memory controller comprising:
a plurality of signal interfaces to communicate signals via a plurality of communication links with respective ones of the bidirectional signal interfaces of the memory IC;
a command interface to convey settings of a routing circuit in the memory IC such that the memory IC may properly route the signals between the plurality of communication links and the plurality of memory banks; and
queues to store a set of commands for transmission to the memory IC;
control logic to determine the settings of a routing circuit in the memory controller configured to route read data and write data, corresponding to the set of commands, between the queues and the plurality of signal interfaces, and to determine the settings of the routing circuit in the memory IC, each of the memory controller routing circuit settings and memory IC routing circuit settings based at least in part on the set of commands in the queues; and
wherein the control logic selects an operating mode, and determines the settings of the routing circuit in the memory IC, based at least in part on the a set of commands being processed, the operating mode specifying whether a particular one of the plurality of communication links is to be used to convey read data or write data, or is to be calibrated, wherein,
during a first time interval, a first communication link in the plurality of communication links is to be used to communicate read or write data, while a second communication link in the plurality of communication links is to be concurrently calibrated.

21. The memory controller of claim 20, wherein the second communication link is to communicate read or write data during a second time interval.

22. A method, performed by a memory controller, for communicating with a memory integrated circuit (IC) via first and second data communication links, the memory IC having a plurality of bidirectional signal interfaces and first and second bank sets, each bank set including at least one bank, the method comprising:
in response to first commands to write to a first address in the first bank set in the memory IC and to read from a second address in the second bank set in the memory IC, storing the first write data in a queue in the memory controller for later transmission to the memory IC, receiving first read data from the memory IC via the second data communication link, and concurrently calibrating the first data communication link;
in response to second commands to write to a third address in the second bank set in the memory IC and to read from a fourth address in the first bank set in the memory IC, sending the first write data and the second write data to the memory IC via the first data communication link and concurrently receiving second read data from the memory IC via the second data communication link;

utilizing queues within the memory controller to store a set of commands for transmission to the memory IC;

utilizing control logic within the memory controller to determine the settings of a routing circuit in the memory controller configured to route read data and write data, corresponding to the set of commands, between the queues and the data communication links, and to determine the settings of a routing circuit in the memory IC, each of the memory controller routing circuit settings and memory IC routing circuit settings based at least in part on the set of commands in the queues.

* * * * *